Dec. 28, 1926.

F. OLSON

STEAM ENGINE

Filed April 14, 1922

WITNESSES

INVENTOR
FRANCIS OLSON.
BY
ATTORNEYS

Dec. 28, 1926.

F. OLSON

STEAM ENGINE

Filed April 14, 1922

WITNESSES

INVENTOR
FRANCIS OLSON.
BY
ATTORNEYS

Dec. 28, 1926.

F. OLSON

STEAM ENGINE

Filed April 14, 1922

INVENTOR
FRANCIS OLSON.

WITNESSES:

ATTORNEYS

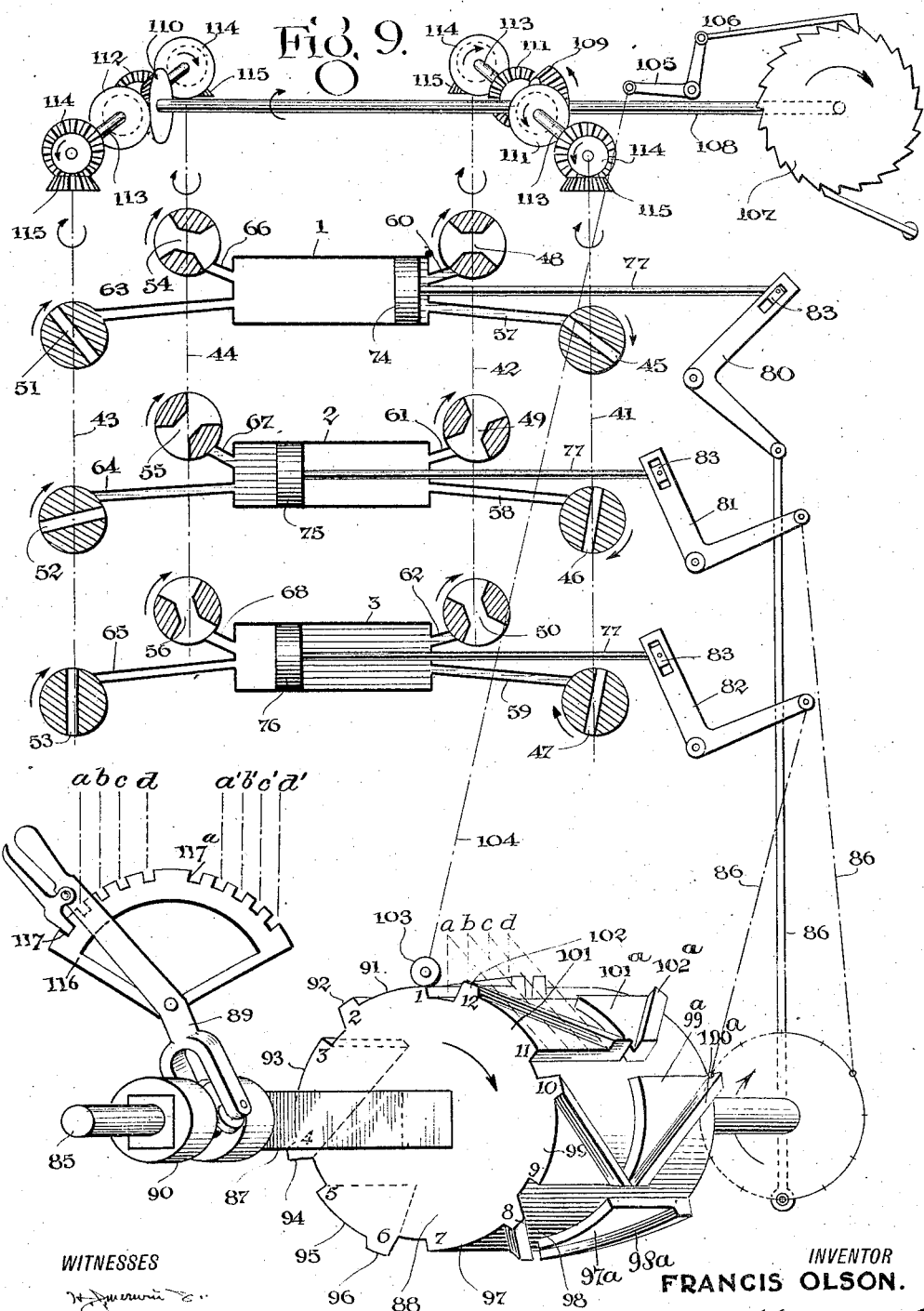

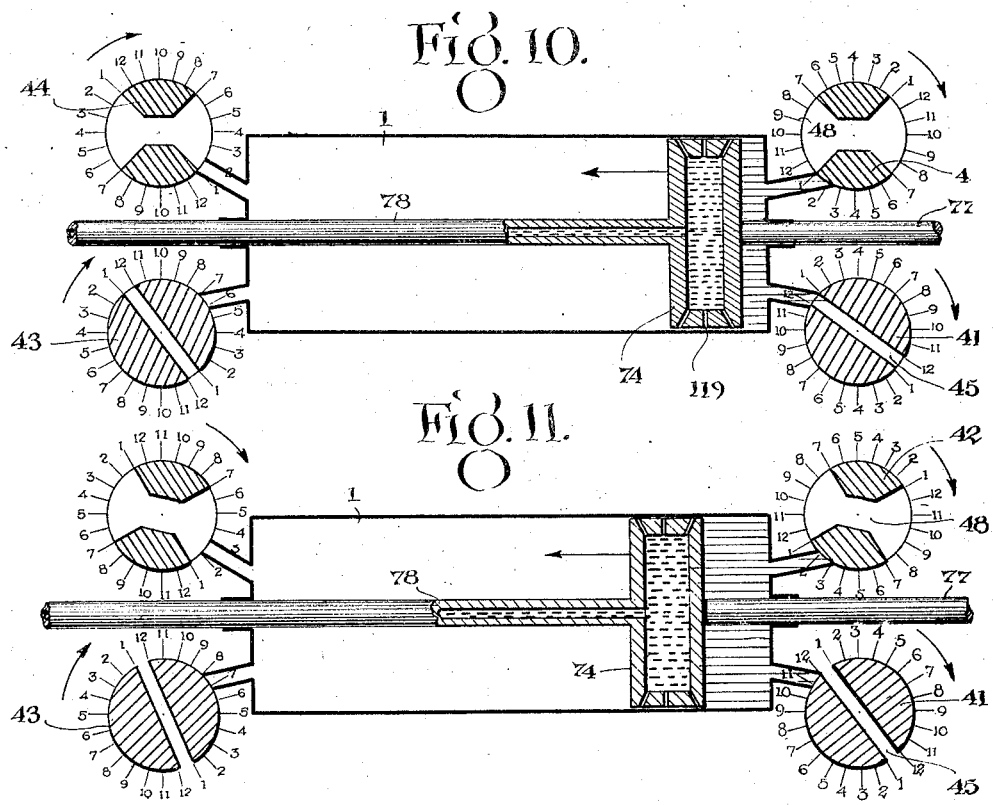

Dec. 28, 1926.  F. OLSON  1,612,208
STEAM ENGINE
Filed April 14, 1922    9 Sheets-Sheet 8
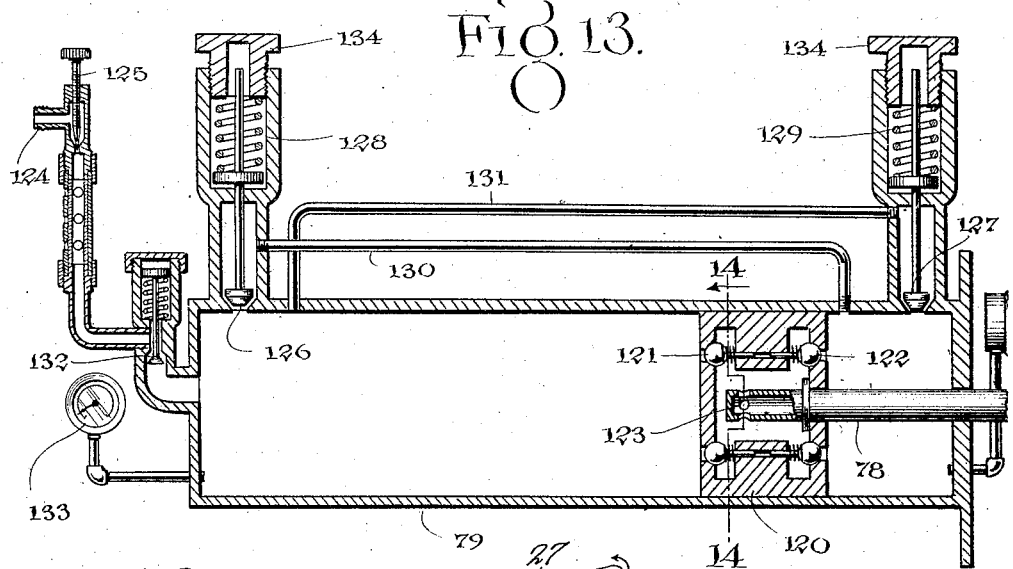
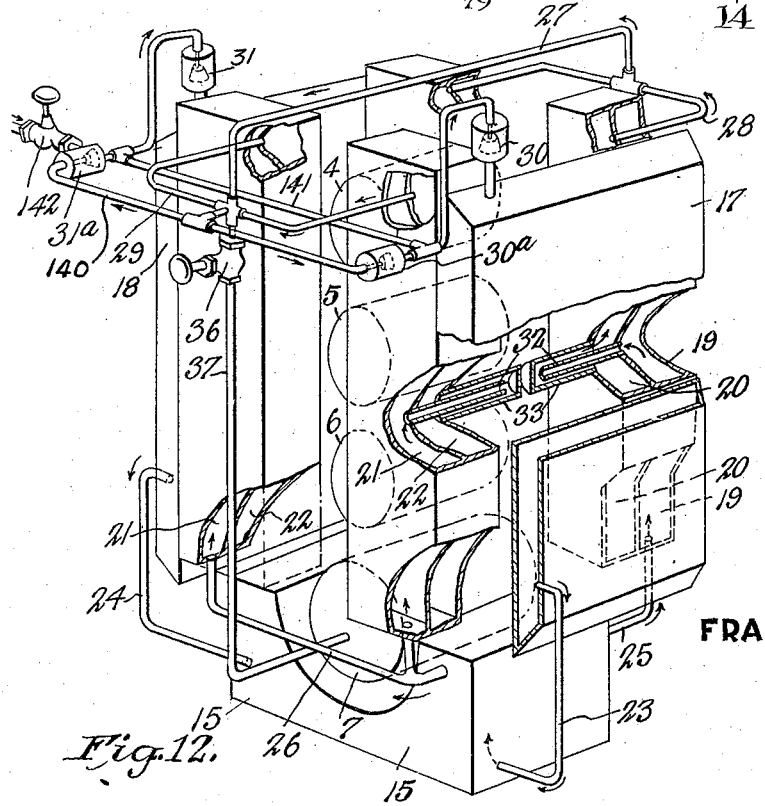
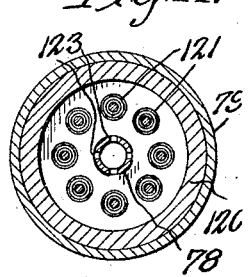
FRANCIS OLSON.
INVENTOR
BY *Munn & Co.*
ATTORNEYS

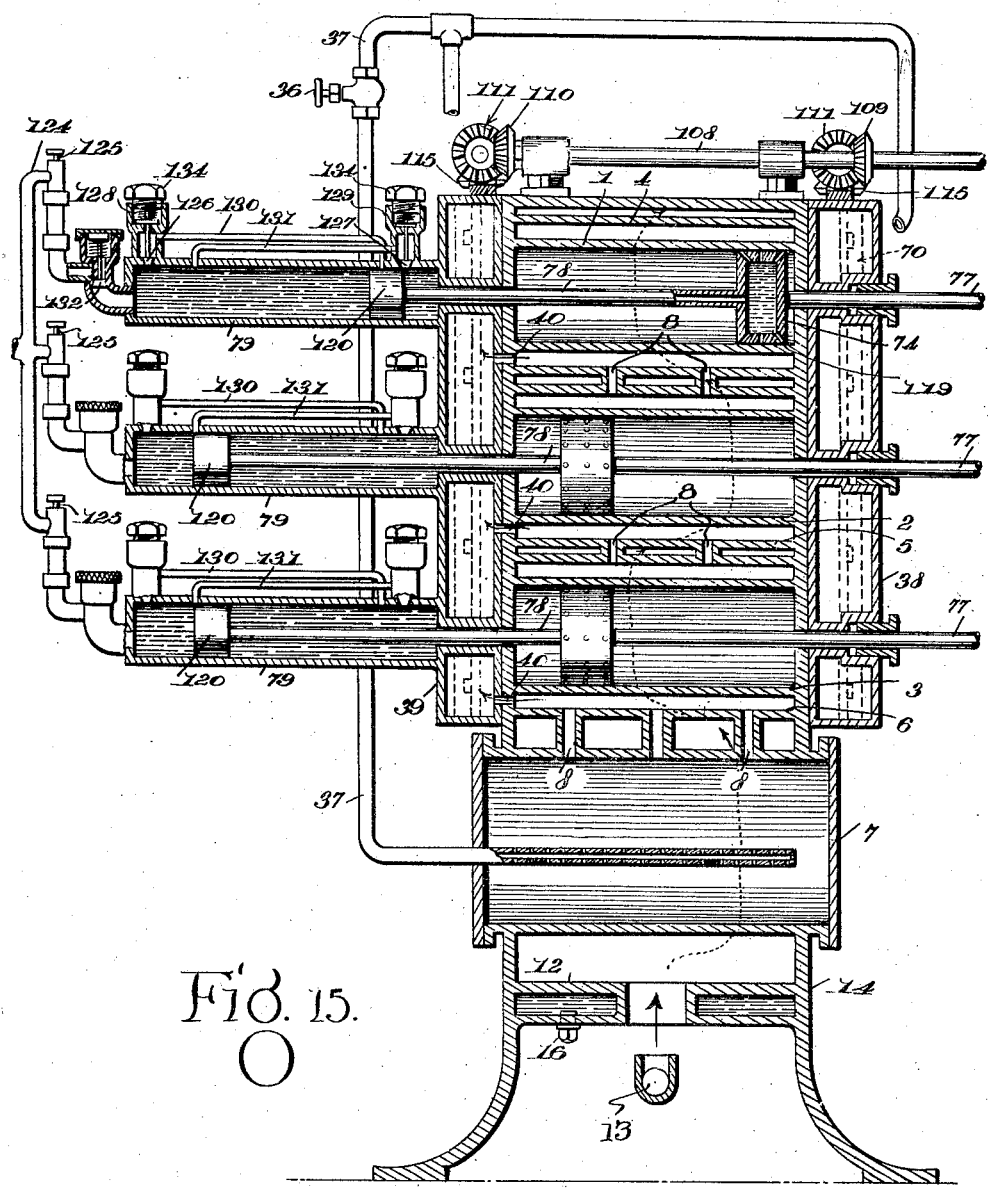

Patented Dec. 28, 1926.

1,612,208

UNITED STATES PATENT OFFICE.

FRANCIS OLSON, OF STORY CITY, IOWA.

STEAM ENGINE.

Application filed April 14, 1922. Serial No. 552,501.

My invention relates to improvements in steam engines, and it being understood that compressed air may be used instead of steam and it consists in the constructions, combinations and the mode of operation herein described and claimed.

An object of my invention is to provide an engine in which both the water and steam are circulated in a novel manner for the respective purposes of heating the water in the shortest possible time and bringing the steam up to a very high pressure.

A further object of the invention is to provide an engine wherein the cylinders are jacketed with steam.

A further object of the invention is to provide an engine wherein the cylinders and steam jackets are surrounded by flame.

A further object of the invention is to provide an engine which is almost wholly surrounded by hot water.

Other objects and advantages will appear in the following specification, reference being had to the accompanying drawings, in which:—

Figure 1:
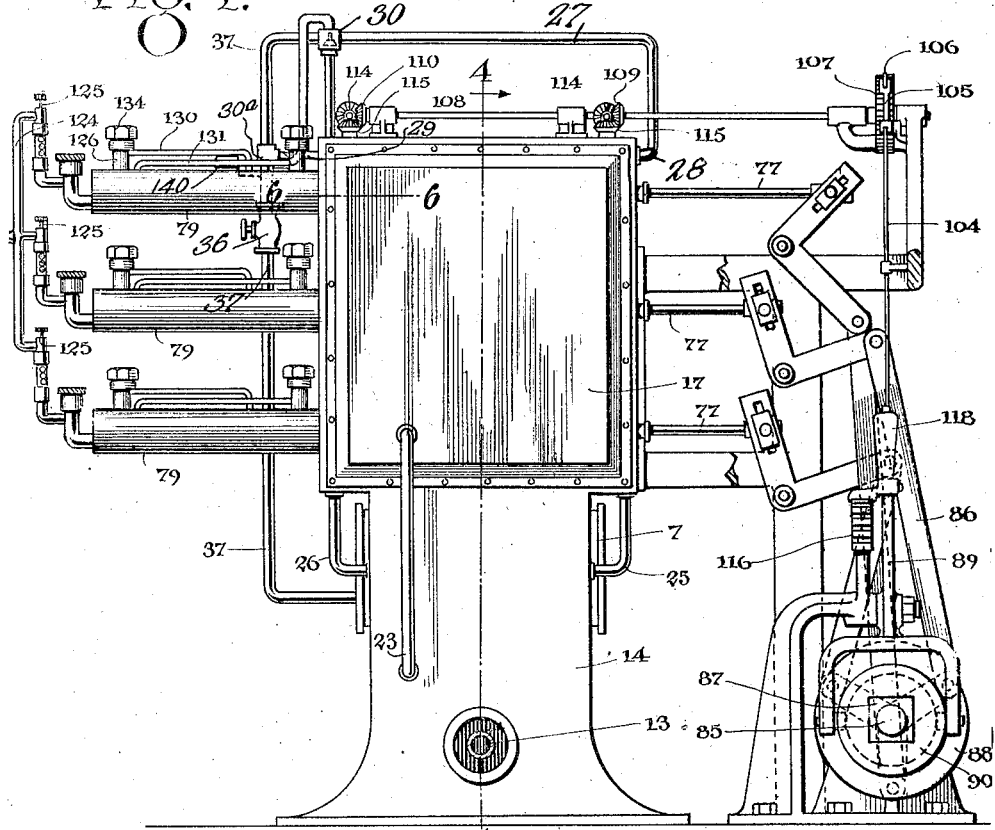
Fig. 1 is a side elevation of the engine.
Figure 6:
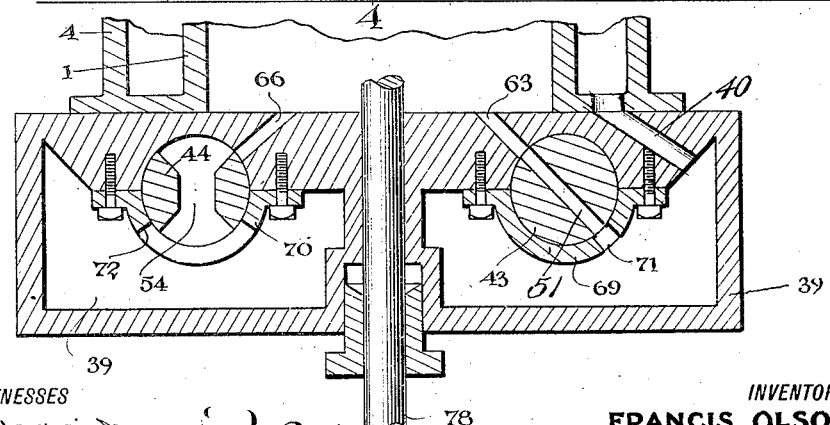
Figure 2:
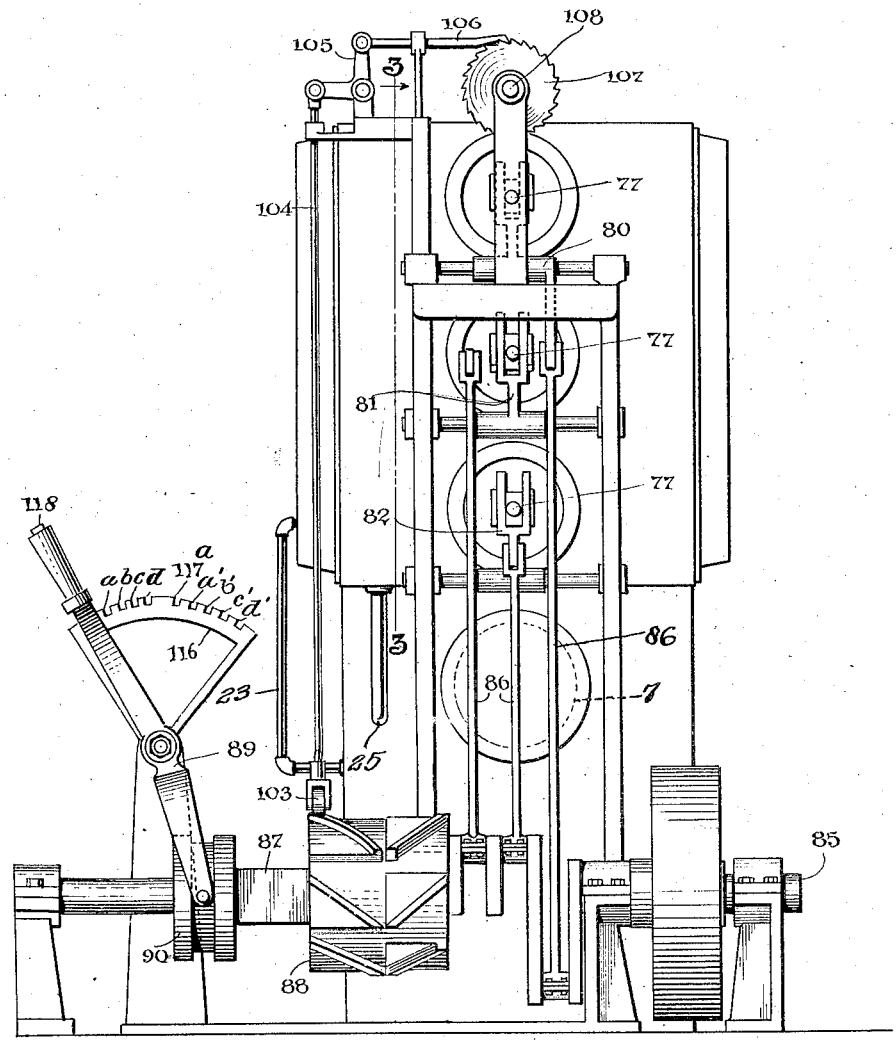
Fig. 2 is a front elevation.
Figure 5:
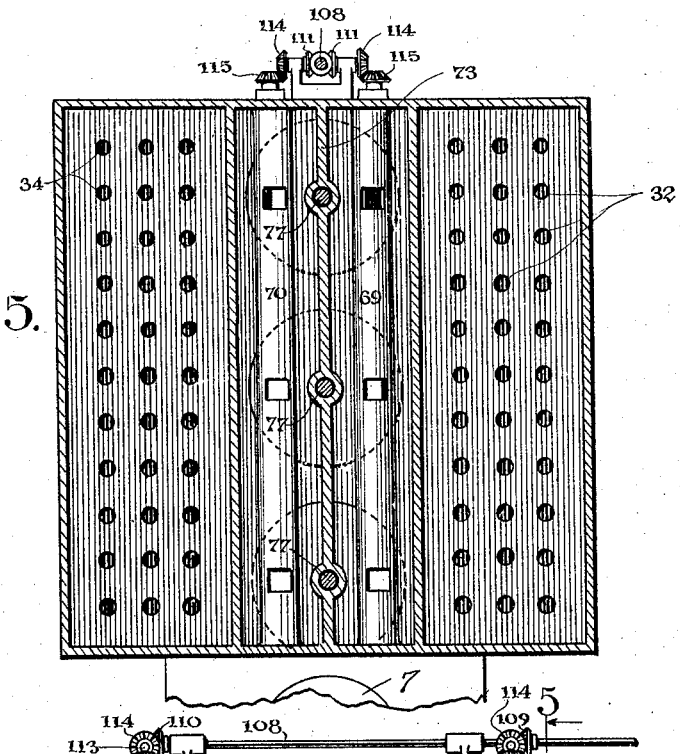
Figure 3:
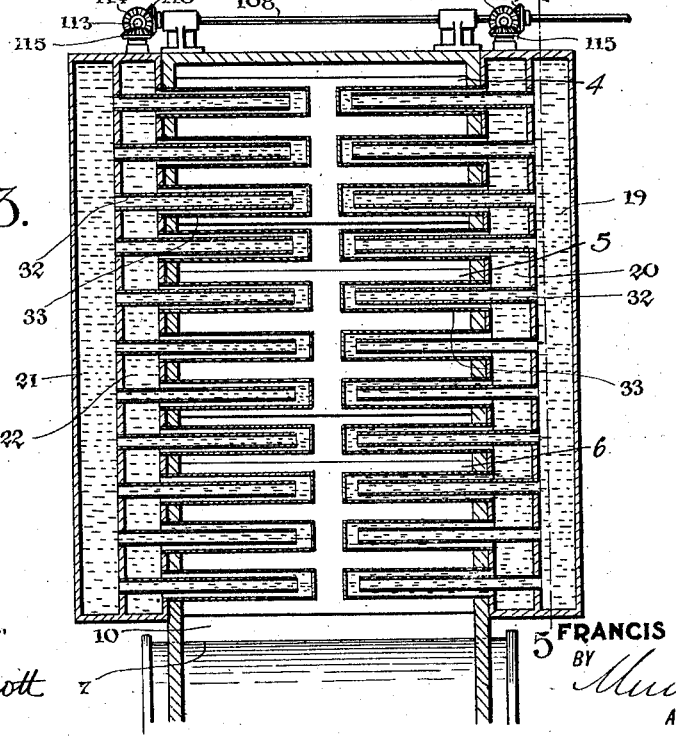
Figure 4:
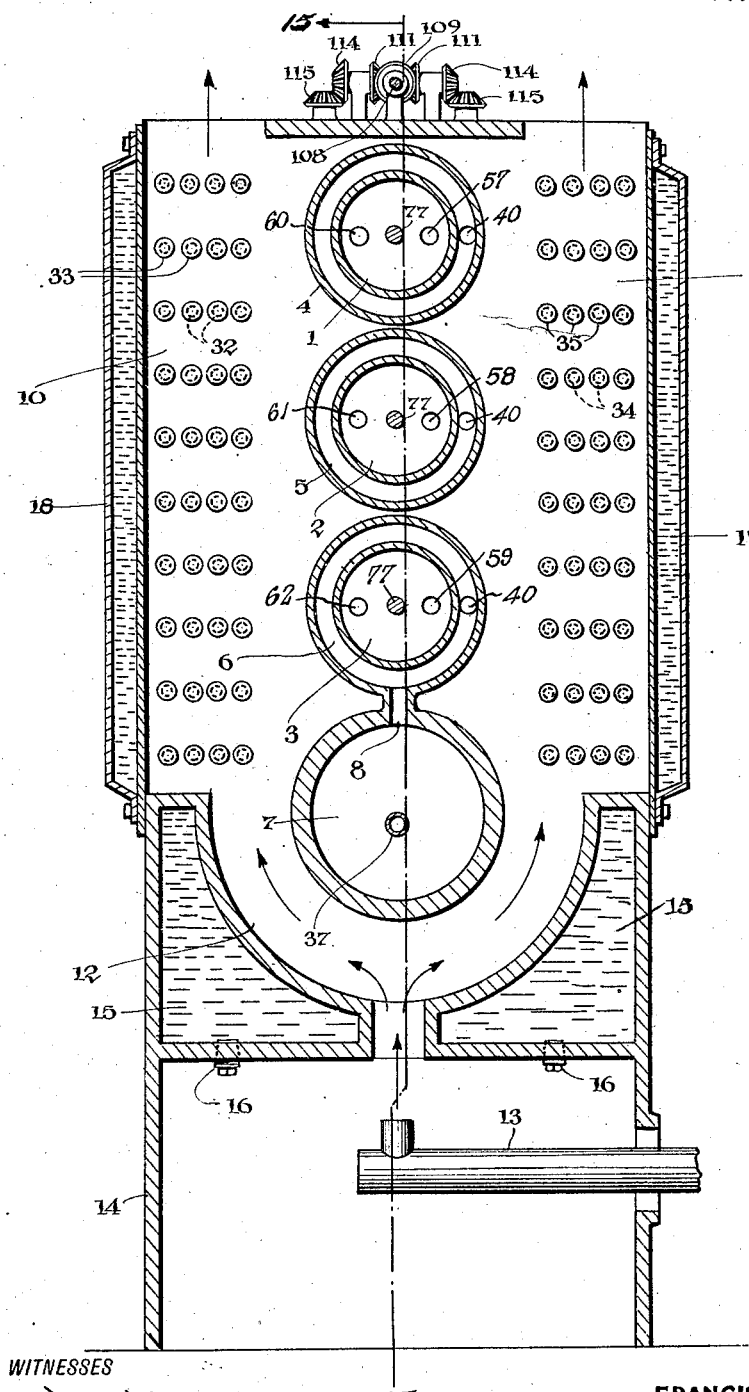

Fig. 3 is a section taken on the line 3—3 of Fig. 2, parts of the structure there shown being omitted, Fig. 4 is a section on the line 4—4 of Fig. 1, Fig. 5 is a section taken substantially on the line 5—5 of Fig. 3, Fig. 6 is a detail horizontal section on the line 6—6 of Fig. 1, illustrating the cylindrical inlet and exhaust valves in the cylinder head at one end of the engine cylinders, Fig. 7 is a diagram illustrating the movement of the three pistons through one cycle of operation, Fig. 8 is a diagram (fully described below) intended to illustrate the functions of the cams on the cam cylinder in controlling the cylindrical intake and exhaust valves, Fig. 9 is another diagram which may be read in connection with Fig. 8, more fully illustrating the operations of the intake and exhaust valves and the cam cylinder, Fig. 10 is a diagram corresponding to the uppermost engine cylinder in Fig. 9 and illustrating the position of the four valves when the piston is at the particular position illustrated, Fig. 11 is a diagram of the same engine cylinder showing how the valves have been shifted by the cam cylinder at the next step in the movement of the piston, Figure 12 is a diagrammatic perspective view partially in section, chiefly illustrating only those parts concerned with the water circulating system, Fig. 13 is a longitudinal section of one of the oil pumps, Fig. 14 is a detail cross section of the piston taken on the line 14—14 of Fig. 13 and Fig. 15 is a vertical longitudinal section on the line 15—15 of Fig. 4, some of the pistons and valve casings which should appear in section being shown in elevation for ease in illustration.

The construction of the engine comprises the cylinders 1, 2 and 3 which are jacketed at 4, 5 and 6 respectively. Steam from a chest or generator 7 (Figs. 4 and 12) passes to each of the jackets 4, etc., through passages like passage 8 in Fig. 4. The cylinders 1, etc., are thus kept hot, thus contributing toward the efficiency of the engine. Flame spaces 10 and 11 at the sides of the steam jackets 4, etc., conduct flames and smoke from a furnace 12 to a suitable point of discharge. The furnace 12 is concentric with the steam generator 7. The furnace is intended to be supplied with gaseous or liquid fuel through a pipe 13. The foregoing, and other parts, are carried by a base 14.

Water chests or spaces 15 flank the furnace 12. Water may be supplied to the chests 15 by any suitable means for example, by the means illustrated in Figure 12. Accumulations of sediment may be removed by unscrewing the plugs 16.

Longitudinal water compartments 17 and 18 (disposed parallel to the axes of the cylinders 1, etc.) form the other sides of the flame spaces 10 and 11. Outer and inner water compartments 19, 20 and 21, 22 are disposed in sets laterally and transversely of the cylinders 1, etc., and adjacent to the respective ends thereof as illustrated in Fig. 12.

Pipes 23 and 24 connect the water chest 15 with the water compartments 17 and 18 respectively. Pipes 25 and 26 connect these chests with the outermost sets 19 and 21 respectively. A pipe 27 is the common connector of the water compartments 17 and 18 by means of a branch 140 (Fig. 12) and also of the sets of inner water compartments 20 and 22 through branches 28 and 29. Pairs of back check valves 30, 30ª, and 31 31ª in the branch 140 permit the water to flow from pipe 27 into the compartments 17 and 18 when heated.

A cross pipe 141 connects with the branch 140 between the pairs of back check valves, and a water valve 142 is connected at one of the places of connection.

The furnace heats the water in the opposing series of tubes 32, 33 and 34, 35 which project into the flame spaces 10 and 11 respectively from the compartments 19, 20 and 21, 22. The former of these tubes are open-ended; the latter closed-ended. The heat causes the water to circulate in the directions of the arrows and substantially along the following paths: The water in the tubes 33 and 35 rapidly becomes heated and starts the circulation which can only be upwards, out of the tubes 33 and 35 through branches 28 and 29 into the common pipe 27, and through the back check valves 30 and 31 into the longitudinal water compartments 17 and 18.

From the compartments 17 and 18 the water flows downwardly into the water chests 15, upwardly through pipes 25 and 26 into the outer compartments 19 and 21 and thence into the open ended tubes 32 and 34. The water has now made a complete circuit. Both the temperature and pressure have increased. A valve 36 (Figs. 1 and 12) is opened when the water reaches the desired temperature and pressure. This valve is located in a pipe 37 which joins the common connector 27 to the steam chest 7. The valve 142 is opened next, admitting water to the cross pipe 141 whence it flows into the compartments 17 and 18 and the circulation system. This flow is permitted by the check valves 30 and 31 but the check valves 30ª and 31ª prevent incoming cold water from entering the pipe 37.

The end of the pipe 37 inside of the steam chest 7 has numerous perforations through which the hot water sprays against the walls of the steam chest. Since these walls are heated by the furnace 12, the water instantly turns into steam which passes into the three steam jackets 6, 5 and 4 (Fig. 4) by way of passages 8, one of which is illustrated in Fig. 4.

The cylinders 1, etc., and steam jackets 4, etc., are fastened to cylinder heads 38 and 39 at the right and left ends respectively. A part of the cylinder head 39 is shown in detail in Fig. 6. The cylinder heads are hollow, and steam is admitted from the jackets 4, etc., by openings 40 (Figs. 4 and 6). The cylinder heads 38 and 39 have cylindrical intake and exhaust valves 41, 42 and 43, 44. These valves are disposed in pairs adjacent to each end of the cylinders. Each valve has three ports to open and close corresponding passages into the respective cylinders. The inlet valve 41 has ports 45, 46 and 47 (Fig. 9); the exhaust valve 42 has ports 48, 49 and 50; the inlet valve 43 has ports 51, 52 and 53 and the exhaust valve 44 has ports 54, 55 and 56. The ports of the inlet valve 41 control passages 57, 58 and 59; the ports of the valve 42, passages 60, 61 and 62; the ports of the valve 43, passages 63, 64 and 65, and the ports of the valve 44, passages 66, 67 and 68.

The cylindrical valves rotate in seats of which caps 69 and 70 (Fig. 6) are parts. The steam inlet passages are adapted to have communication with the cylinder heads when the ports of the intake valve come into registration, so that steam may be admitted into the various cylinders 1, 2 and 3. To this end, the cap 69 (Fig. 6) has an opening 71 in continuation of the passage 63. The cap 70 (Fig. 6) has an opening 72 in continuation of the passage 66, through which the steam exhausts when the port 54 comes into registration.

Obviously, each cylinder head must be divided so as to confine the live and exhaust steam to the appropriate sides, and a partition 73 (Fig. 5) is provided for this purpose. The engine cylinders have pistons 74, 75 and 76 respectively (Figs. 7, 9 and 10). Each piston has rods 77 and 78 which extend in opposite directions. The former are solid, the latter hollow and for the purpose of conducting oil from the associated pumps 79. The oil pump is fully described under the appropriate heading below. The rods 77 of the respective pistons 74, 75 and 76 are connected to bell cranks 80, 81 and 82 by means of cross heads 83 which are in the nature of blocks arranged to slide on suitable ways in the upper ends of the bell cranks.

The bell cranks are joined to the cranks 84 (Figs. 1 and 2) of the engine shafts 85 by means of connecting rods 86. The reciprocation of the pistons 74, etc., causes the rotation of the engine shaft. A portion 87 of the engine shaft is non-circular (Fig. 9), on which a cam cylinder 88 is adapted to be slid by means of a lever 89 which has suitable connection with a pair of collars 90. These collars must be considered a part of the cylinder or drum 88 in Fig. 9. The two parts are shown separated in order to avoid obscuring certain cams on the drum. It is more important to show the cams than it is to show the collars and the drum connected, which in fact they are in actual practice.

The face of the drum 88 has cams 91, 92, 93, 94, 95, 96, 97, 98, 99, 100, 101 and 102 which are intended for the forward operation of the engine. The drum carries somewhat similar cams for the reverse operation of the engine. These cams are shown only in part (Fig. 9), such as are illustrated, being indicated 97ª, 98ª, 99ª, 100ª, 101ª, and 102ª, it being observed that these reverse cams mentioned correspond to the forward cams on that part of the drum nearest the observer.

The leading edges of the cams 91, 93, etc. are substantially parallel to the axis of the drum. The trailing edges of the cams 92, 94, etc., are disposed at an angle so as to meet the straight edges of the foregoing cams. The sets of cams are successively higher, that is, 92 is higher than 91, 94 higher than 93, and so on, but the cams 91, 93, etc. are all of the same height and so are the cams 92, 94, etc. Whenever any one of the cams 91, 92, etc. (Fig. 9) strikes the roller 103, motion is imparted to all four cylindrical valves 41, 42, 43 and 44.

This is done by means of a connecting rod 104, bell crank 105, pawl 106 and ratchet 107. The ratchet is fixed on the end of a longitudinal gear shaft 108. The shaft carries two gears 109 and 110. These respectively drive pinions 111 and 112 on divided countershafts 113. The end of each section of countershaft carries a pinion 114, and these pinions in turn mesh with pinions 115 on the upper ends of the cylindrical valves.

The purpose of arranging the gearing in the manner described is to cause all of the cylindrical valves to turn in the same direction (clockwise looking down). Obviously, other gear arrangements may be used to effect the same purpose, and the same ultimate result in the operation of the engine may be obtained by rotating the valve according to other plans. The clockwise direction of rotation is here chosen in order to make it easier to understand the operation.

The sole function of the forward cams 92, 94, 96, 98, 100 and 102 and similar reverse cams, is to close intake valves. This can be seen by reading the legends in Fig. 8. The cam 92 closes the right hand intake valve 41, the cam 94 closes the left hand intake valve 43, and so on alternately. The time of closure of the intake valves, or in other words, the time of steam cut off, can be varied by shifting the drum 88. This is done by the lever 89, as explained above. The lever works over a quadrant 116 (Fig. 9) which has five notches 117, a, b, c and d which relate to the forwardly operating part of the drum 88, and five similar notches 117ª, a', b', c' and d' which relate to the reversely operating part of the drum. The operator may shift the lever 89 over the left side of the quadrant to manipulate the drum 88 during the forward operation, and when he shifts the lever past the vertical center onto the right side of the quadrant he may manipulate the drum for the reverse operation of the engine.

When the latch 118 occupies the notch 117 the drum 88 is shifted practically to the limit in respect to the roller 103 and therefore the period between the opening of an intake valve (right hand intake 41, for example) by the cam 91 and the closure of the same valve by the cam 92, is the longest. This period is shortened by moving the latch 118 into the positions a, etc., and it can be seen that corresponding positions a, b, c, and d over the drum 88 (Fig. 9) correspond to diminishing portions of the cams, so that when the lever 89 is set into the last notch d, the drum 88 will have been shifted so far toward the left in respect to the roller 103 that the time of opening and closing an intake valve occurs almost simultaneously.

The operation of the engine may now be readily followed. The manner of heating the water is clearly illustrated in Figs. 4 and 12. The heat of the flames from the furnace 12 causes the water to circulate as indicated by the arrows in Fig. 12, the circulation beginning at the outer tubes for example 33, continuing through the inner compartments 20 and 22, branches 28 and 29, pipe 27, back check valves 30 and 31, longitudinal water compartments 17 and 18, pipes 23 and 24, water chests 15, pipes 25 and 26, outer compartments 19 and 21 and inner tubes 32 and 34.

As soon as the valve 36 is opened, hot water from the pipe 27 flows through pipe 37 into the steam chest 7 where it is instantly turned into steam. The steam passes into the jackets 4, 5 and 6, thence into the live steam compartments of the cylinder heads 38 and 39 through the openings 40. The valves 41 and 43 (Figs. 9 and 10) control the admission of steam into the three cylinders 1, 2 and 3. The valves 42 and 44 control the exhaust of the steam. The two kinds of valves may be readily distinguished by the shape of the ports. The ports of the inlet valves are relatively small and straight across, while the ports of the exhaust valves are larger and have flaring ends which extend over six points (90 degrees) according to the scale of division in Figs. 10 and 11.

The cams 91, 92, 93, etc. in Figs. 8 and 9 are also numbered "1," "2," "3," etc., for short, and these numbers correspond with the radial positions of the inlet and exhaust valve ports in Figs. 10 and 11. The twelve points 1, 2, 3, etc., of the drum 88 (Fig. 9) represent one revolution of the shaft 85. Each point or cam moves the ratchet 107 once for the distance of one tooth. There are twenty-four teeth on the ratchet and consequently the gear shaft 108 makes a half revolution to one revolution of the shaft 85.

This motion (of the shaft 108) is imparted directly to all four of the valves 41, 42, 43 and 44. Consequently, the valves make a half revolution to one revolution of the shaft 85. The valves in Figs. 10 and 11 are divided into twenty-four parts circumferentially to correspond with the twenty-four teeth of the ratchet 107 (Fig. 9) but the halves are numbered from 1 to 12 to correspond with the twelve points or cams of the drum 88. Fig. 7 illustrates the twelve relative positions of the pistons 74, 75, and 76 in the cylinders 1, 2, and 3 at the times when the points 1, 2, 3, etc. (Fig. 8) come under the roller 103. The twelve positions in Fig. 7 are designated No. 1, No. 2, No. 3, etc. to correspond.

Assume now that point 1 (cam 91, Figs. 8 and 9) has lifted the roller 103. The ratchet 107 is moved one tooth. All of the valves 41, 42, 43, and 44 are moved one space, and the following occurs:

Cylinder #1 opens right hand intake port 45 to passage 57, closes right hand exhaust port 48 to passage 60, opens left hand exhaust port 54 to passage 66.

All other ports are also advanced one step. The port 51 for the left hand intake passage 63 of cylinder #1 has yet to go six steps before steam registration occurs. This corresponds to the time when point 7 (Fig. 8) reaches the roller 103. It also corresponds to the time when piston 74 completes its left stroke in cylinder #1 (position No. 7, Fig. 7). It also represents one-half revolution of the shaft 85. Assume now that point 2 (cam 92, Fig. 8) has moved under roller 103. All ports are advanced another space. Port 45 of the right hand steam intake passage 57 is moved out of registration and the admission of steam thereby cut off. The movement of piston 74 by the expansion of the steam can be followed through positions Nos. 1, 2, 3, 4, 5, 6, and 7 in Fig. 7. The other ports 48, 51 and 54 for cylinder #1 remain the same as they were under the preceding steps so far as their activities are concerned.

Compare Figs. 10 and 11. Fig. 10 shows the positions of the parts associated with cylinder #1 when point 1 (Fig. 8) is under the roller 103. Fig. 11 shows the positions of the parts associated with cylinder #1 when point 2 (Fig. 8) is under the roller 103. Assume that point 3 (cam 93, Fig. 8) has moved under roller 103. The following takes place:

Cylinder #3 opens left hand intake port 53 to passage 65, closes left hand exhaust port 56 to passage 68, opens right hand exhaust port 50 to passage 62.

The foregoing acts occur when the piston 76 (Fig. 9) reaches the end of its left stroke (No. 3, Fig. 7). Point 4 (cam 94, Fig. 8) again closes the left hand intake port 53 so that the steam may expand according to the diagram in Fig. 7. The actions of the twelve cams on the drum 88 constitute one cycle of operation which may be said to embrace one-half of the circumference of the cylindrical valve. It is unnecessary to describe the step-by-step motion of each valve in detail as the reader undoubtedly understands that each time that the roller 103 is lifted by a cam, all of the cylindrical valves are moved one space. The various ports are so positioned in the first place that the operation will work out right. The reader will also understand that it is necessary to flare the ends of the exhaust ports 48 and 54 (for cylinders #1 #2 and #3) so that an exhaust port may be opened throughout the whole return stroke of the piston. The flared ends of the exhaust ports extend over six points on one-fourth of the circumference of the valve. These six points correspond to the six points (or cams) on the face of the drum 88, which also extend over one-half of the circumference of the drum.

The oil pump in Fig. 13 is like any one of the three shown in Fig. 1. The function of the oil pump is to keep the engine piston (for example, 74 in Fig. 10) supplied with oil so that it is lubricated in the cylinder, and the oil also assists in maintaining a tight joint between the moving surfaces. The oil is discharged radially through ports 119. Any suitable arrangement of packing rings (not shown) may be employed in connection with the radial ports.

Referring to Fig. 13, 79 indicates the pump cylinder, described before. A piston 120 reciprocates in the pump cylinder because it is carried by the hollow rod 78 of the piston 74. There is an arrangement of ball check valves 121 and 122 inside of the piston 120. These have springs behind them, and they are intended to open on opposite strokes of the piston. Oil enters the hollow rod 78 through openings 123.

The cylinder 79 is supplied with oil from a suitable source 124. The supply may be regulated by a needle valve 125. There are relief valves 126 and 127 at the opposite ends of the cylinder 79. These are held seated by springs 128 and 129. The springs are overcome only by a pressure against the companion valves when it exceeds a predetermined amount. Pipes 130 and 131 connect the chambers of valves 126 and 127 with the opposite ends of the cylinder 79. Fig. 13 clearly shows the arrangement.

Consider the piston 120 to be moving toward the left with the piston 74 in Fig. 10. The valves 121 open, admitting oil into the hollow piston 120. The oil is forced into the hollow rod 78 and out of the apertures 119 (Fig. 10) to lubricate the walls of the cylinder 1. The pressure on the oil at the left of the piston 120 will presently overcome the spring 128 so that the valve 126 opens and lets the oil pass to the right through pipe 130 into the right end of the cylinder 79. A valve 132 prevents the oil from flowing back to the source 124. This valve opens on the reverse movement of the piston 120 so that the supply in the cylinder 79 is replenished.

The foregoing action takes place on the rightward movement of the piston 120. Gauges 133 indicate the oil pressures by means of the cylinder 79, and the readings of the gauges are to be taken as indexes for the adjustment of the tension of the springs 128 and 129 by means of screw plugs 134.

While the construction and arrangement of the improved engine as herein described and claimed, is that of a generally preferred form, obviously modifications and changes may be made without departing from the spirit of the invention, it being further understood that the principles and combinations herein disclosed may apply to engines of all types as well as to engines of the type shown.

I claim:—

1. A power plant having a pair of double opposing water compartments each consisting of inner and outer water spaces, a pair of single water compartments extending from one double compartment to the other, said compartments defining a flame space; means connecting the inner water spaces to the single compartments, closed-ended tubes extending from the inner water spaces into the flame space, open-ended tubes extending from the outer water spaces into the closed-ended tubes, one or more steam-jacketed cylinders situated in said flame space, a steam generator also in said flame space and communicating with the steam jackets, means for conducting heated water from said inner spaces to said generator thereby to supply the jackets with steam, and means by which steam from said jackets is conducted to the cylinders.

2. A power plant comprising a steam generator, a furnace to heat the steam generator, said furnace being surrounded by a water chest, water compartments in communication with the water chest in turn defining a flame space for the furnace, a cylinder situated in said flame space having a jacket to be supplied with steam from the generator, tubes extending from the compartments into said flame spaces in order to heat the water, means to conduct the heated water to the steam generator for the formation of steam, means to conduct the steam to said jacket and means to control the admission of steam from the jacket to the cylinder.

3. A power plant comprising one or more engine cylinders, steam jackets enclosing the individual cylinders, double water compartments disposed transversely of the axes of the cylinders, single water compartments located parallel to the axes of the cylinders and at each side thereof, said compartments forming certain walls of the flame space of a furnace; tubes extending from the double water compartments into the flame space parallel to both the axes of the cylinders and to the single water compartments, a steam generator, means conducting heated water to said generator after passage through said tubes, means to conduct the resulting steam to said steam jackets, and means for admitting steam from said jackets to said cylinders.

4. A power plant having a circulation system, comprising sets of tubes arranged one within the other, means to heat the set of tubes, pairs of water compartments from which the tubes of the respective sets extend and in which the heat initiates a circulation of water, a common pipe connecting similar ones of the pairs of compartments, other water compartments, pipes connecting said common pipe with said other water compartments, back check valves in said pipes permitting the water to flow only toward said other compartments, a water chest with which said other compartments communicate, said water chest being heated by said heating means, means connecting the water chest with the remaining ones of the aforesaid pairs of water compartments, a flash boiler, a pipe connecting said common pipe with the flash boiler by which pipe water may be abstracted from said common pipe, and a working cylinder to which the generated steam is conducted from the flash boiler.

FRANCIS OLSON.